Z. STREET.
CATTLE CAR.
No. 96,500. Patented Nov. 2, 1869.
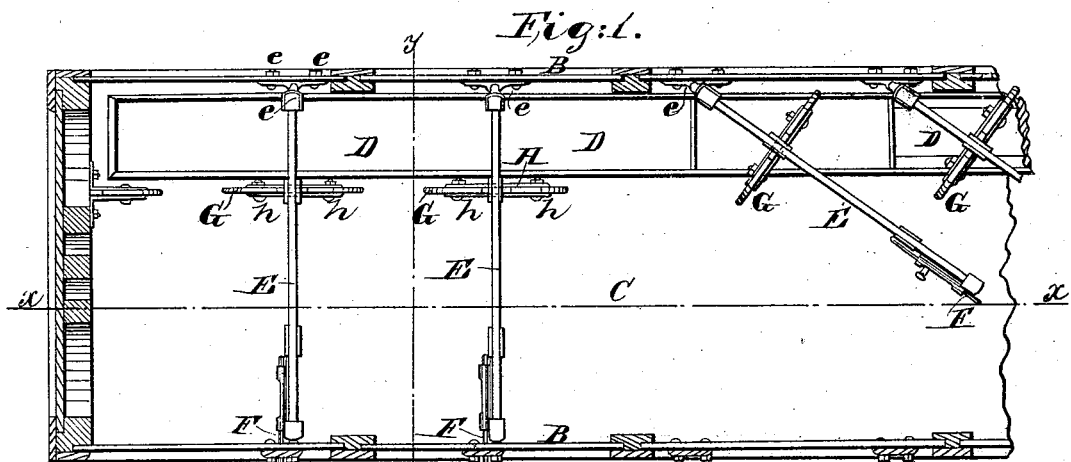
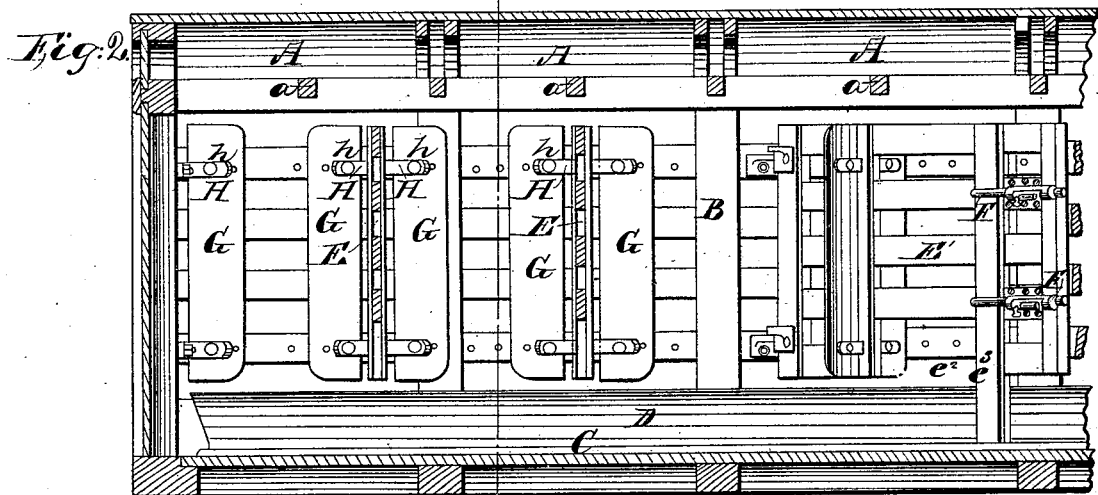
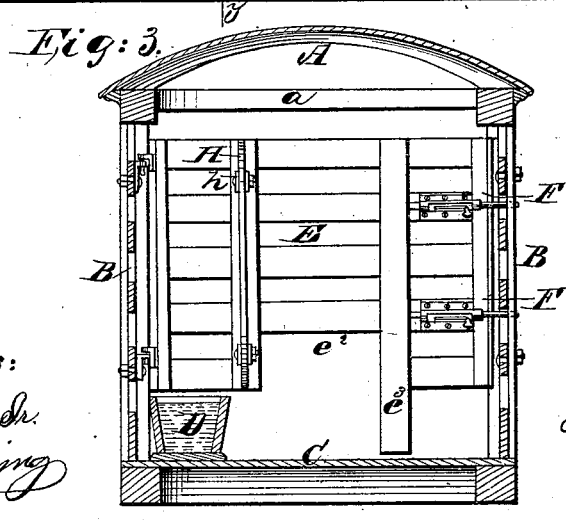
Witnesses:
Wm. H. Brereton Jr.
W. B. Deming
Inventor:
Zadok Street
By Knight Bros
Attorneys

United States Patent Office.

ZADOK STREET, OF SALEM, OHIO.

Letters Patent No. 96,500, dated November 2, 1869.

IMPROVED CATTLE-CAR.

The Schedule referred to in these Letters Patent and making part of the same.

I, ZADOK STREET, of Salem, in the county of Columbiana, and State of Ohio, have invented a new and useful Improvement in Stock-Cars, of which the following is a description.

Nature and Objects of the Invention.

The object of my invention is to provide for the transportation of live stock (especially cattle) without suffering from violence or fatigue, or from the deprivation of air, food, or water, and with the greatest possible economy of room.

To these ends, I construct my car with hinged adjustable and removable partitions, so that each animal may be separated from its neighbors, while the spaces allotted to them are regulated in accordance with the size of the animals.

The hinging of each partition at one end adapts them to swing similarly to gates, so that as each animal takes its place in the car, a partition is closed and bolted beside it, after which another animal is put in, and so on till the car is full.

Spaces are formed in the lower edges of the partitions, to afford more room for the legs and abdomens of the animals, when lying down, without allowing room enough to endanger the animal getting fast under the partition.

The animals' heads are confined by yokes, which are formed by boards, projecting horizontally from each side of each partition, near its hinged end, and adapted to close easily upon the neck, as the partition is swung into position. The yokes are adjustable in the extent of their projection, to suit different animals.

Troughs are provided for feeding and watering the stock at stations along the road, so that they may be conveyed to any distance, without suffering or injury, and consequently without the great loss to their owners, which now commonly occurs.

Description with Reference to the Drawings.

In the accompanying drawings—

Figure 1 shows a plan of my improved stock-car with the roof removed.

Figure 2 is a vertical longitudinal section at $x\ x$, fig. 1.

Figure 3 is a transverse section at $y\ y$, figs. 1 and 2.

Similar letters of reference indicate corresponding parts in the several views.

The roof A, sides B, and floor C, may be constructed in the manner usual in cattle-cars.

D represents a trough, for feed and water, extending from end to end, along that side of the car toward which the animals face.

E E represent partitions or gates, secured at one end by hook-hinges $e\ e$, so that they may swing freely or be entirely removed, when required.

Their free ends are held by bolts, F F, when in their closed position, as shown at E E, in all the figures.

At E', in figs. 1 and 2, the partitions are shown swung back, to admit the cattle.

G G are vertical bars, or slabs of wood, or metal, projecting from the sides of the gates E, near their hinged ends, and serving, when the gates are closed, to confine the heads of the cattle.

These bars or slabs are attached to their supporting-brackets H by bolts, $h$, passing through any of a series of holes, $g\ g\ g$, or they are made adjustable by other means.

The gate-attachments are also made adjustable in any proper way, so that the gate may be set nearer together or further apart, to suit animals of different sizes. In the present illustration, this adjustment is provided by a series of holes for the reception of the attaching-bolts of the hinges.

An open space, $e^2$, under the central part of each gate, affords room for the legs of the animals, or the greater projection of their bodies when lying down, but vertical bars or parts, $e^3$, forming parts of the frame of the gate, and projecting nearly down to the floor, at or near the hips, prevent any danger of the animal getting fouled or fast beneath the gate The gates can, if preferred, be suspended from the top of the car, and let down while in use, instead of being swung from the side of the car, as shown. In either case they are readily placed upon beams, $a\ a$, or in any manner stowed away in or on the top of the car, so as to leave its entire capacity for use in stowing dead freight on the return trip.

Operation.

The partition-fastenings having been adjusted to about the proper distance asunder to suit the animals to be conveyed, and the gates hung for one-half of the car, and swung open, as each ox walks in, he is followed up with the gate, so that by the time he reaches his place, he is in a stall, with his head fastened with greater security and comfort than if tied with a rope. In this way an entire car may be loaded in a few seconds, ready for feeding or moving. The entire space of the car is thus utilized, for, when lying down, the animals will actually lie against one another from end to end of the car, so that the partitions, though very valuable and efficient in promoting the comfort and security of the animals, actually take up no space when properly constructed and applied.

At proper intervals along the road, men should be stationed with necessary appliances for feeding and watering, water being provided at one station, meal or grain at another, and hay at another, and so on, so that by proper alternations of feed and water, the animals may be kept in as good and healthy a condition, while on transit, as if stalled in a barn.

Claims.

I claim as my invention—

1. A cattle-car, with removable transverse partitions or gates E, hinged adjustably to the car-side, constructed with open spaces $e^2$, and downwardly-projecting bars $e^3$, and adapted to operate substantially as and for the purposes set forth.

2. In combination with the gates E, the yoke-bars G, for fastening the animal, as explained.

To the above specification of my improvement in stock-cars, I have signed my hand, this 2d day of August, 1869.

ZADOK STREET.

Witnesses:
 OCTAVIUS KNIGHT,
 F. F. MARBURY, Jr.